United States Patent [19]

Hanssen et al.

[11] Patent Number: 5,379,107
[45] Date of Patent: Jan. 3, 1995

[54] PROCESS AND APPARATUS FOR THE MEASUREMENT OF OBJECT TOPOGRAPHIES BY MEANS OF PROJECTED FRINGE PATTERNS

[75] Inventors: Adalbert Hanssen, Konigsbronn; Albrecht Hof, Aalen, both of Germany

[73] Assignee: Carl-Zeiss-Stiftung, Heidenheim, Germany

[21] Appl. No.: 63,175

[22] Filed: May 14, 1993

[30] Foreign Application Priority Data

May 29, 1992 [DE] Germany ............................ 4217768

[51] Int. Cl.$^6$ .............................................. G01B 11/24
[52] U.S. Cl. ...................................... 356/376; 356/243; 250/237 G
[58] Field of Search ................. 356/376, 375, 243, 43, 356/1; 250/237 G, 238, 561; 358/107

[56] References Cited

U.S. PATENT DOCUMENTS

| | | | |
|---|---|---|---|
| 4,682,894 | 7/1987 | Schmidt et al. | 356/243 |
| 5,085,502 | 2/1992 | Womack et al. | 356/243 |
| 5,135,308 | 8/1992 | Kuchel | 356/376 |
| 5,135,309 | 8/1992 | Kuchel et al. | 356/376 |
| 5,146,293 | 9/1992 | Mercer et al. | 356/376 |

Primary Examiner—Richard A. Rosenberger
Assistant Examiner—Hoa Q. Pham

[57] ABSTRACT

In a process and apparatus for measuring object topographies by means of projected fringe patterns, to enlarge the region of certainty, different periodicities are evaluated. Calibration of the measurement apparatus is carried out in at least two parallel planes, situated in the forward and in the rearward regions of the measurement volume. Corrected phase values are first calculated from the phase measurement values of the measurement object. By combination of the phase measurement values relating to the pattern of long periodicity and of the pattern of short periodicity, the fringe order of the phase values relating to short periodicity is calculated. By interpolation of the correction values between the two planes in which the reference measurements were carried out, the measurement process and a corresponding measurment apparatus provide highly accurate measurement values, with simultaneously reduced requirements on the accuracy of mechanical and/or optical adjustment.

10 Claims, 4 Drawing Sheets

PROCESS AND APPARATUS FOR THE MEASUREMENT OF OBJECT TOPOGRAPHIES BY MEANS OF PROJECTED FRINGE PATTERNS

FIELD OF THE INVENTION

The present invention relates to a process and an apparatus for the measurement of object topographies by means of projected fringe patterns.

BACKGROUND OF THE INVENTION

The disclosure of U.S. Pat. No. 5,135,309 of the same assignee as the present invention, which issued Aug. 4, 1992 is incorporated herein by reference. That patent discloses measurement processes and apparatus in which several fringe patterns are projected onto an object for highly precise measurement within a large region of certainty. Phase measurement values from several projection arrangements are evaluated such that first phase measurement values arise relating to a first spatial periodicity with a large contour surface distance (long periodicity) within the depth of the measurement volume and second phase measurement values arise relating to a second spatial periodicity with small contour surface distance (short periodicity). A contour surface here means a surface of the same phase position.

The phase measurement values relating to the long periodicity make possible a determination of the surface coordinates that is unambiguous, though inexact, within the measurement volume. The phase measurement values relating to the short periodicity on the other hand make possible an ambiguous determination of the surface coordinates, from which a value can be selected unambiguously with the aid of the long periodicity.

Reference phase values obtained during a calibration measurement are subtracted from the calculated phase measurement values for the measurement object, in order to correct for errors due to imperfections in the mechanical and/or optical construction. However, only reference phase values are considered that were obtained by measurement on a single reference surface. These do not supply information of any kind about the variation of the errors within the measurement volume, so that in spite of the calibration measurement a nearly perfect construction is required.

Calibration processes for fringe projection processes or projection moire processes are known from DE-OS (German Offenlegunschrift) 3,813,692 (Kwarta et al.) and DE-PS (German Granted Patent) 4,011,780, in which numerous calibration measurements in mutually parallel planes are carried out. However, only patterns of a single period are worked with, so that unambiguous measurement values can be achieved with these measurement processes only within a single period. No teachings of any kind can be gleaned relating to measurement processes and apparatus with which signals of different periods are used for calculating the object topography. Moreover this calibration process is very time-consuming, because calibration measurements in very many parallel planes, e.g., in 32 planes according to DE-OS 3,813,692, have to be carried out.

SUMMARY OF THE INVENTION

The object of the present invention is to provide measurement processes and apparatus of the kind mentioned above in discussing U.S. Pat. No. 5,135,309, in which phase measurement values are evaluated that have spatial periodicities with at least two different contour surface distances and in which requirements on the mechanical and/or optical adjustment accuracy are clearly reduced.

In the process according to the invention, at least two calibration measurements are carried out. A first calibration measurement is carried out on a calibration surface with known surface topography at a known place in the forward region of the measurement volume, and thus relatively close to the measurement apparatus. The second calibration measurement is carried out on a calibration surface in the rear region of the measurement volume, likewise with known coordinates. With the aid of the reference phase values obtained in these reference measurements, and associated theoretical phase values to be expected in the reference measurements from the nominal equipment geometry and the known coordinates on the reference surfaces, interpolated correction values within the measurement volume are calculated. With the aid of these correction values, the phase measurement values for the measurement object, or object coordinates calculated from the phase measurement values, are corrected. The order of sequence of the first and second calibration measurements, that is, which of these measurements is carried out before the other, is of no relevance.

Because only the phase measurement values relating to the long periodicity within the measurement volume supply unambiguous results, both the phase order and the phase remainder are known only from these phase measurement values. It is advantageous firstly to calculate an apparent phase value subject to error (PK'), including the order (NK'), relating to the short periodicity, from these phase measurement values, taking account of the reference phase values and the associated theoretical phase values relating to the long periodicity.

Whether it is appropriate to first determine the coarse z-coordinates of the measurement object point concerned and to calculate from these coarse z-coordinates the apparent phase value (PK'), depends on the selected equipment geometry and, resulting from it, the complexity of the evaluation equations to be employed. With convergent arrangements, in which the optical axes of the projectors and of the camera intersect at a point in the measurement volume, a coarse z-determination is advantageous. With parallel arrangements, in which the optical axes are all aligned parallel, the formulas can be combined and the apparent phase values (PK') can be directly calculated, without the coarse z-position appearing as an intermediate result. In both cases, the theoretical course of the short periodicity and the reference values and the number of orders, known from the theoretical geometry, between the two reference values relating to the short periodicity are incorporated in the calculation of the apparent phase value (PK'). The apparent phase value (PK') consists of an integral part, the order (NK'), and a fraction, the phase remainder (RK'):

$$PK' = NK' + RK'$$

Due to the measurement value noise and due to equipment errors, it can happen that the order (NK') is determined as a value too great or too small by unity.

It is therefore appropriate to split the calculated apparent phase value (PK') into the order (NK') and the phase remainder (RK') and to compare the phase remainder with an offset-corrected value calculated from the phase measurement value (DK) relating to the short periodicity. If the difference between the calculated phase remainder (RK') and the offset-corrected phase measurement value (DK') is greater than ½, the fringe order (NK') is increased by 1. If, on the other hand, the difference between the corrected phase measurement value (DK') and the calculated phase remainder (RK') is greater than ½, the fringe order (NK') is reduced by the value 1. In all other cases, the value of the fringe order remains unchanged.

The three space coordinates of each measurement object point are finally calculated from the corrected fringe order (NK) and the offset-corrected phase value (DK') relating to the short periodicity. The reference values for the short periodicity and the nominal geometry data of the equipment are again taken into account. The process is carried out for all camera pixels with valid phase measurement values.

For the correction of the phase values, a linear function can be used that exactly reproduces the theoretical phases for points on the calibration surfaces. Such a simple linear interpolation saves determining or adjusting the angles within the mechanical and/or optical arrangement to within minutes of arc, and the controlling of distances with a relative accuracy of better than $10^{-3}$.

The calibration measurements are advantageously carried out in two parallel positions on a flat, white matt surface. A single calibration body with a single such surface can be provided and arranged in the measurement volume at different, known distances relative to the measurement apparatus. Advantageously, the distances are chosen such that the reference values of the forward position differ from the reference values of the rearward position relating to the short periodicity by a non-integer number (orders) greater than 1.

Influences of temperature changes on the mechanical and/or optical structure can be compensated by computation. The temperature of the measurement apparatus is measured for all measurements and the controlling correction coefficients used in dependence upon temperature. In the simplest case, the temperature drift of the measurement structure is determined, in that a step body is measured at different temperatures in a fixed distance, and the determined temperature dependence is later taken into account during correction of the phase measurement values.

For carrying out the measurement process according to the invention, the measuring apparatus has an evaluation computer having two image memories for storing correction data obtained by two calibration measurements relating to the long periodicity; two further image memories for storing correction data obtained by two calibration measurements relating to short periodicity; and two stored tables (so-called look-up tables—LUT). One LUT is used to estimate the apparent phase values subject to error, including the phase order, relating to the short periodicity, from the offset-corrected measurement values relating to the long periodicity. The second LUT is used to calculate the fringe order relating to the short periodicity from the estimated, apparent phase values subject to error and offset-corrected measurement values relating to the short periodicity.

DESCRIPTION OF THE DRAWINGS

Preferred Embodiments of the invention will now be described in detail with reference to the drawings, in which.

DETAILED DESCRIPTION

Figure 1:
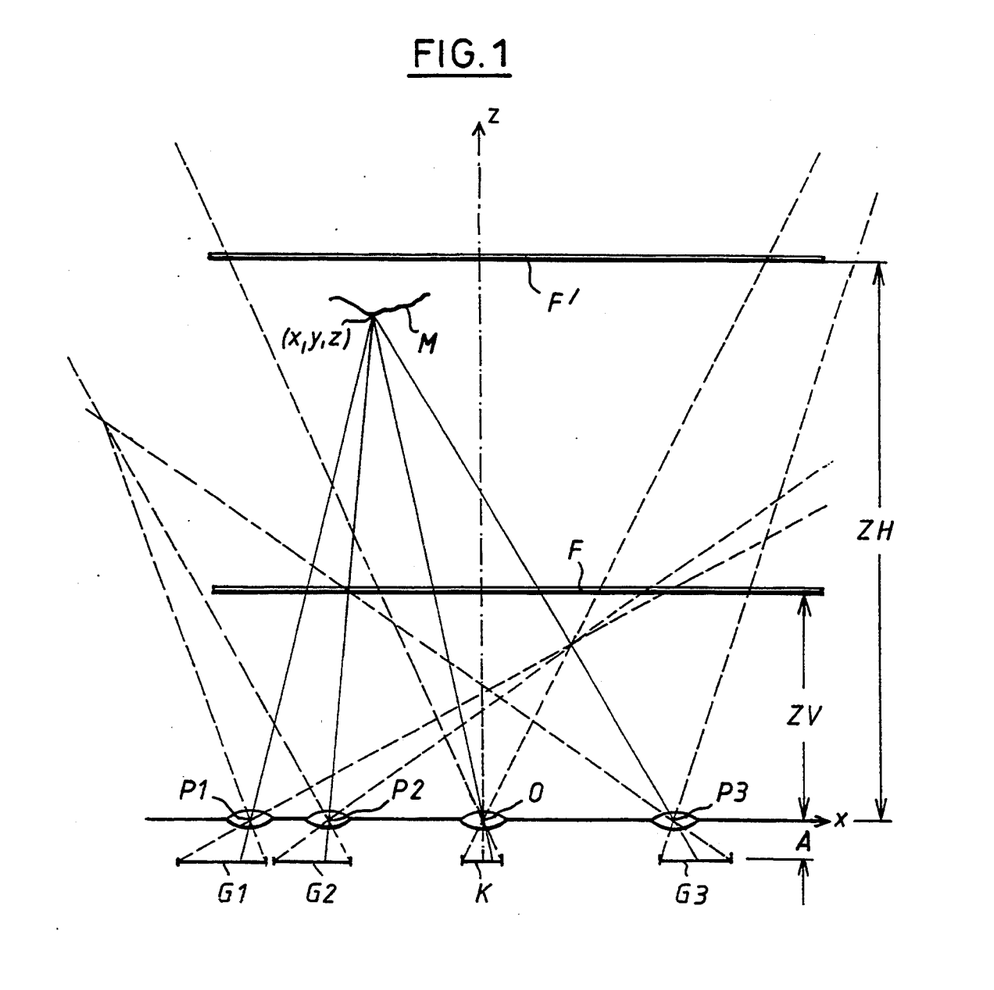
FIG. 1 shows a sketch of the basic principle of the invention, showing the optico-geometrical structure of a preferred embodiment of the invention.

The fringe projection arrangement shown in FIG. 1 has three projectors arranged adjacent to each other, the projection centers of which are respectively denoted by (P1, P2, P3). The projectors respectively project, oneafter the other, a fringe pattern onto the object to be measured. For this purpose, gratings (G1, G2, G3) of the same period (G) are arranged for this purpose behind the projection objectives. The grating planes of the three gratings (G1, G2, G3) are aligned parallel, and the grating lines run perpendicularly to the plane of the drawing.

The fringe patterns successively projected onto the measurement object (M) are imaged by a camera objective (O) on a camera sensor (K) and supplied for evaluation to an evaluation computer, which is not shown in FIG. 1.

As has already been described in U.S. Pat. No. 5,135,309, according to whether the difference is formed between the projectors (P1) and (P2), or between the projectors (P1) and (P3), the difference of the phase values of the pattern recorded by the camera (K) represents beats with a periodicity of different length in the direction of the optical axis (Z) of the camera. Because the projection centers (P1) and (P3) lie far apart, the difference of the phase values of these two projectors has a short periodicity, while the difference of the phase values between the projectors (P1) and (P2), which are situated close together, has a long periodicity. On one hand, the measurement volume of the measurement apparatus is given by the region in which the aperture angle of the three projectors (P1, P2, P3) and of the camera objective (O) overlap. The measurement volume can be extended in depth up to where the phase difference relating to the long periodicity at the forward end differs by unity from the corresponding phase value at the rear end. This is the case when the measurable phase remainder assumes the same value at the forward end as at the rear end. Because of measurement accuracy, residual errors, etc., the measurement region in the practical performance of the process is, of course, a few percent smaller than this theoretical maximum value.

For the calibration of the measurement apparatus, a calibration body with a flat, white matt surface (F) is measured successively in two mutually parallel Z-planes. In the first reference measurement, the reference surface (F) is situated at a distance (ZV) from the measurement apparatus. In the second reference measurement, the reference surface is indicated by (F'), at a distance (ZH) from the measurement apparatus.

In the following discussion it is assumed that the origin of the coordinates coincides with the imaging center (O) of the camera objective on the measurement object side; the three projection centers (P1, P2, P3) lie on the X-axis; and the three gratings (G1, G2, G3) and the camera sensor (K) are arranged at the same distance (A) behind the projection centers. If the X-coordinates of the three projection centers are denoted by XP1, XP2, XP3), the positions of the projection centers are chosen for the given measurement region (ZV-ZH), such that the following holds:

$$(XP1-XP2) \, A \, (1/ZV-1/ZH) < G \qquad (1)$$

The long periodicity then runs through less than one order within the measurement volume, and the Z-coordinate of a point of the measurement object (M) within the measurement volume can be determined unambiguously. The position of the third projection center (P3) is chosen depending upon the smallest change (d) in the long periodicity which can still be determined with certainty:

$$(XP1-XP2)/(XP1-XP3) > d$$

The evaluation of the fringe pattern recorded by the camera (K) will now be explained with reference to FIG. 2.

The fringe pattern recorded by the camera (K) is digitized by an analog/digital converter (1) and fed to a phase calculation stage denoted by (2). In this phase calculation stage, the fringe phases in the recorded images of the individual projectors are first successively calculated, and the beats between the fringe phases of different projectors are then formed, and represent the long or the short periodicity. The calculation of the fringe phases and these beat phases is expressly described in U.S. Pat. No. 5,135,309. It is not necessary to go into it further at this point.

The stage (2) supplies the beat phases as integer multiples of 1/256. In this internal representation, the fractional portion of the phases is situated in the low-value byte and the integer portion (order) in the high-value one. The calculations modulo 1 which follow later are to be carried out only with the low-value byte, i.e., modulo 256, in the internal representations chosen in this embodiment. The splitting into the integral and fractional portions takes place simply in that only the high-value or the low-value byte is taken.

The beat phases calculated for each image point of the camera (K) are stored in different image memories (3-10), according to the exact point of the measurement procedure which has been reached and whether the phase difference represents the long or the short periodicity. For the control of the course of the measurement and the selection of the related image memory, a host computer, not shown here, is provided. The dashed lines show data paths along which data manipulated by the host computer are transported.

At the beginning of the calibration procedure, the reference surface is arranged at the distance (ZH) in the rear of the region of the measurement volume remote from the measurement apparatus. The phase differences with respect to the long periodicity (RLH) belonging to each image point of the camera are deposited in the image memory (4) and those relating to the short beat (RKH) in the memory (9).

In the second calibration step, the reference surface is arranged in the front region of the measurement volume, and thus near to the measurement apparatus, at the distance (ZV). The positions (ZV) and (ZH) are maintained in that the calibration surface rests on its own tripod during each of the two calibration measurements. The two tripods are dimensioned such that the short periodicities for the front and rear reference surfaces differ by about N+0.5 orders, N being a natural number greater than 1.

The phase differences (RLV) (long periodicity) and (RKV) (short periodicity) are converted according to Equations (2) and (3) to two correction factors (EL) (long periodicity) and (EK) (short periodicity), and are then stored in the associated image memories (3, 10). The factors (SLV) and (SLH) arising in the equation $$EL = (SLV-SLH)/(RLV-RLH) \qquad (2)$$

are the theoretical phase values relating to the long periodicity, calculated on the basis of the nominal equipment geometry, and the values (SKV) and (SKH) in the equation $$EK = (SKV-SKH)/(RKV-RKH) \qquad (3)$$

are the corresponding theoretical phase values relating to the short periodicity. These four factors (SLV), (SLH), (SKV), and (SKH) are calculated from Equation (4) on the basis of the geometrical data.

$$SLH = (XP1-XP2) \, A/(ZH \, G)$$

$$SKH = (XP1-XP2) \, A/(ZH \, G)$$

$$SLV = (XP1-XP2) \, A/(ZV \, G) \qquad (4)$$

$$SKV = (XP1-XP3) \, A/(ZV \, G)$$

These theoretical phase values are constant here for the whole measurement field. In the general case of non-parallel geometry they are pixel-dependent and can be placed in tables in additional memories.

The measurements first supply for all pixels only the phase remainder, not the fringe order. Therefore the jumps of order for the reference measurements, i.e. discontinuities, are first to be eliminated with the host computer by a discontinuity elimination by constant progression. Starting, for example, with the first camera pixel in the first line, the fringe order of (RLH) relating to the long periodicity is set to zero. A search is now made through the first line. Let (D1) be a measurement value and (D2) be the measurement value of the adjacent point. If the difference (D1-D2) is greater than 0.5, the order of (D2) becomes greater by unity than the order of (D1). If on the other hand the difference (D2-D1) is greater than 0.5, the order of (D2) becomes less by unity than the order of (D1). In all other cases, the order (integer part) is carried over unchanged from the adjacent point. The obtained fraction is added to the order which was carried over, raised or lowered, and is then stored.

This discontinuity elimination is used on the data fields (RKH, RKV, RLV and RLH) in succession and the result is stored in the same data field. The values of (RKV) and (RLV) are immediately converted to correction factors (EL, EK) by means of Equations (2) and (3). For (RKV), and thus the reference phase in the forward reference plane relating to the short periodicity, a beginning is made, for the first point, not with the reference phase zero but with the integer portion of short orders between the forward and the rear reference planes for the point in question. This number is known from the approximate positions of the calibration planes and from the distance between (ZV) and (ZH).

Yet further image memories (5) and (8) are provided, in which phase differences for temperature-dependent phase offsets are stored. These temperature-dependent offsets are determined by making measurements on a step body at a fixed distance at different temperatures. The temperature-dependent phase offsets relating to the long periodicity are deposited in image memory (5), and those relating to the short periodicity in image memory (8). The temperature in the measurement volume is measured with the temperature sensor (21) and the data set valid for the respective temperature is stored by the host in the respective memory. Likewise the temperature-dependent influences on (EL) and (EK) are determined and taken into account.

Figure 2:
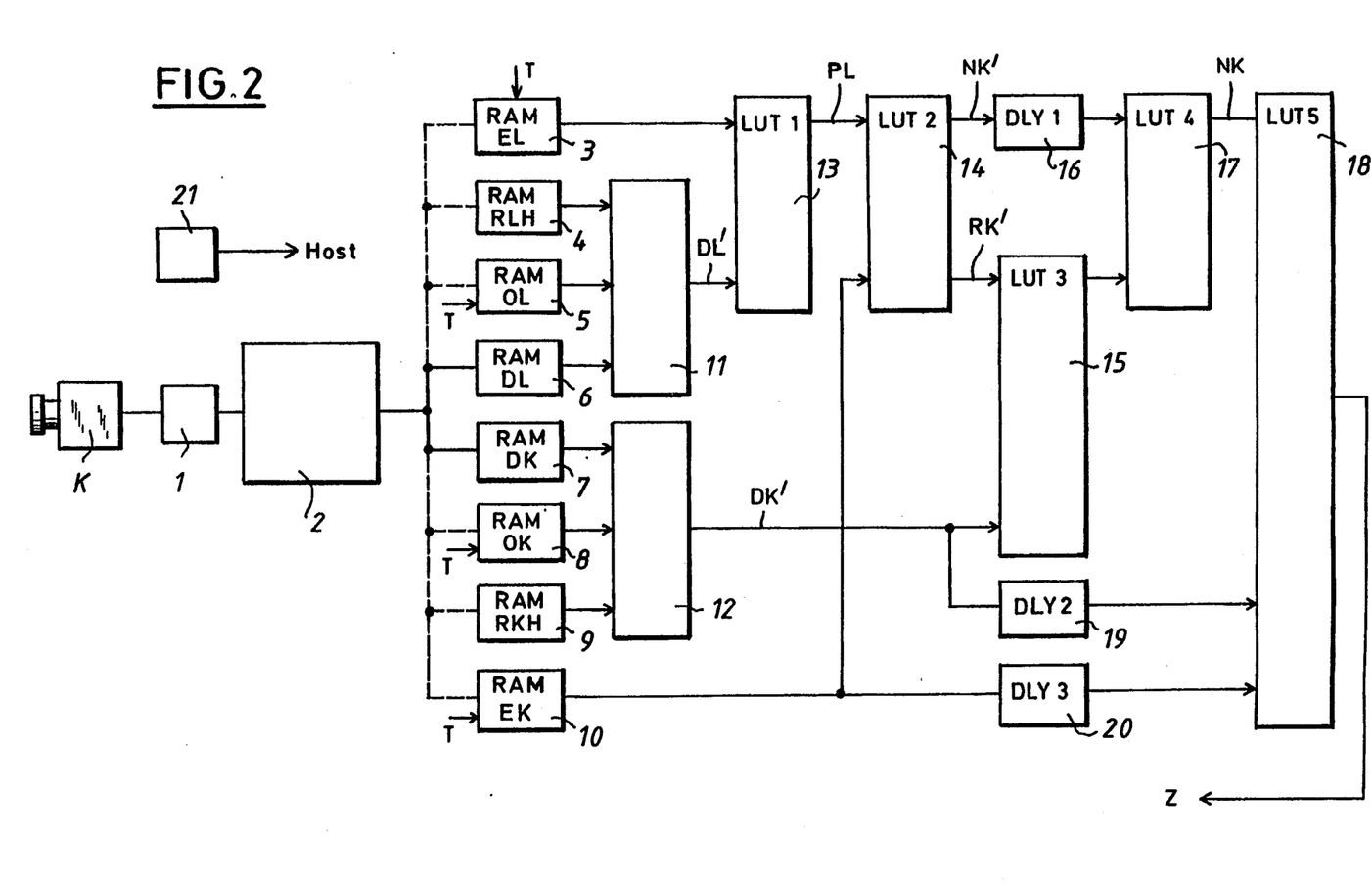
FIG. 2 shows a block circuit digram of the evaluation computer for carrying out the process according to the invention.

Those memories whose content is changed by the host during temperature changes are marked by an arrow with a (T) in FIG. 2.

After the calibration measurements have been carried out and the related correction values have been stored in the image memories (3, 4, 5, 8, 9 and 10) for each image point, the measurement of the desired measurement object (M) can begin. It is to be noted that the calibration is not required before every individual measurement, but can be used over a long service life. For this purpose, the calibration data are additionally stored on a disk and when switching on, are loaded into the image memory concerned.

The phase measurement values at the measured object (M) (FIG. 1) relating to the long periodicity (DL) are deposited in image memory (6), and those relating to the short periodicity (DK) are deposited in image memory (7). In a first stage of calculation (11), a corrected phase value (DL') is calculated from the phase differences (DL) relating to the long periodicity, the associated offset correction (OL), and the reference phase value (RLH), corresponding to the Equation:

$$DL' = (DL - RLH - OL) \text{ Modulo } 1 \tag{5}$$

Correspondingly, a corrected phase value (DK') is calculated from the phase measurement value (DK) relating to the short beat, the associated offset correction value (OK) and the value (RKH) in a second calculator unit (12), corresponding to the equation:

$$DK' = (DK - RKH - OK) \text{ Modulo } 1 \tag{6}$$

In a first LUT (13), a further corrected phase value (PL) is calculated from the corrected phase value (DL'), the theoretical phase difference (SLH), and the correction factor (EL), corresponding to the equation:

$$PL = SLH + DL' EL \tag{7}$$

In a subsequent second LUT (14), the apparent phase value subject to error (PK') is calculated from (PL) and the correction factor (EK), and also equipment constants relating to the short periodicity, corresponding to the equations:

$$PK = PL (XP1 - XP3)/(XP1 - XP2)$$

$$PK' = RKH + (PK - SKH)/EK \tag{8}$$

and are then split into the fringe order (NK') relating to the short beats and the fringe remainder (RK').

The corrected phase value (DK') relating to the short periodicity and also the phase remainder (RK') calculated from the long periodicity are both fed to a third LUT (15), in which it is decided whether the fringe order (NK') has to be raised, maintained or lowered. If the difference (RK'-DK') is greater than 0.5, the fringe order is raised by the value 1. If on the other hand (DK'-RK') is greater than 0.5, the fringe order is decreased by the value 1. In all other cases (NK') remains unchanged. These addition operations take place by means of a fourth LUT (17), to which the fringe order (NK') is likewise fed via a delay line (16). The output value of the fourth LUT (18) is the final fringe order (NK), which is fed to the input of a fifth LUT (18). The values (DK') and the correction factor (EK) relating to the short periodicity are likewise fed via delay lines (19) and 20) to this fifth LUT (18). This fifth LUT carries out a calculation corresponding to the equation $$Z = (XP1 - XP3) A/(G (SKH + (NK + DK') EK)) \tag{9}$$

the result of which is the final Z-value of the measurement object (M) concerned. The term SKH+(NH+DK') EK in Equation 9 represents the final correction of the short periodicity.

Finally, the X- and Y-coordinates of the measurement object (M) are calculated from the Z-coordinates, taking into account the coordinates at the camera, analagous to the manner as described in U.S. Pat. No. 5,135,309.

FIGS. 3a and 3b once again graphically illustrate the correction calculations taking place in the evaluation computer according to FIG. 2.

Figure 3A:
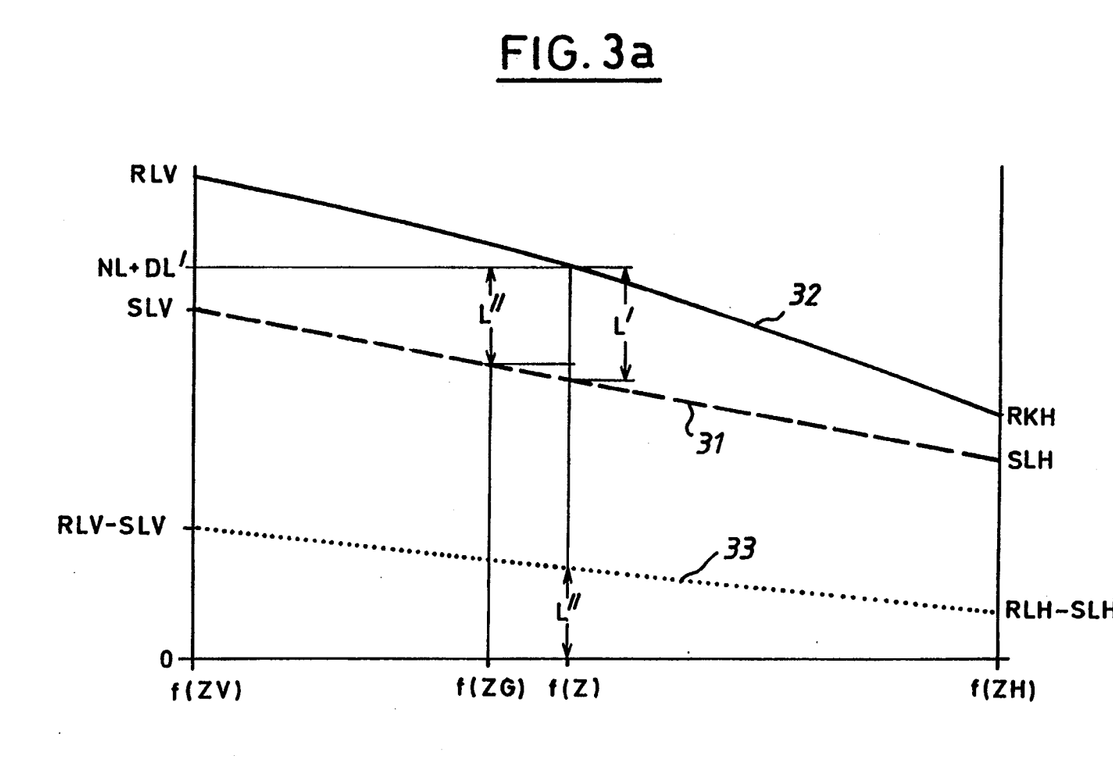
FIG. 3a shows a sketch of the principal courses of the phase of the long periodicity in the measurement volume.
Figure 3B:
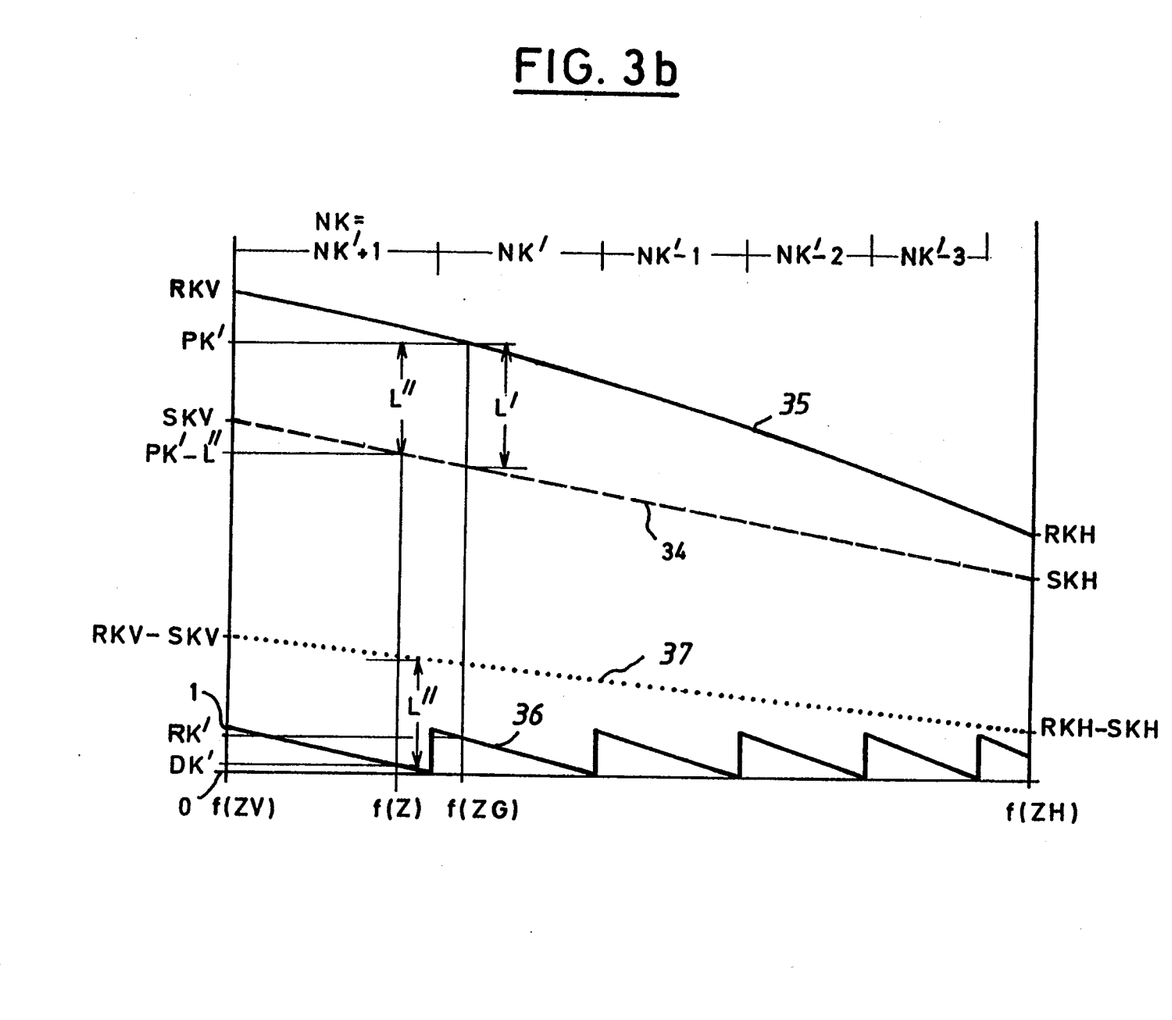
FIG. 3b shows a sketch of the principal courses of the phase of the short periodicity in the measurement volume.

In these Figures, the course, respectively dashed, of the theoretical phase values to be expected for the theoretical geometry is diagrammed over a function f(Z) for a camera pixel. The function f(Z) is chosen such that this theoretical phase course (31, 34) runs nearly linearly in the measurement volume, i.e., between (ZV) and (ZH). In the arrangement according to FIG. 1, f(Z)=1/Z is to be chosen. In general, the concerned function f(Z) for each central projective arrangement can be calculated with reference to the equations given in Applied Optics, Vol. 16, No. 8, pp. 2152-2162, (1977) (Idesawa et al.).

The full curve (32) shows the course of the phase measurement values which result for the long periodicity within the measurement volume. These phase measurement values deviate from the theoretical phase values because of unavoidable adjustment errors. The same holds for the course (35) of the phase relating to the short periodicity in FIG. 3b, which results from the elimination of discontinuities from the curve (36). In actuality only the end points (RLH) and (RLV) and also (RKH) and (RKV) are measured during the calibration, not the whole course. By perturbation calculations and tolerances derived therefrom for the deviations of the actual equipment geometry from the theoretical form, it is ensured that the residual errors remaining in the long periodicity during the correction cannot lead to a false order in the short periodicity.

The reference phase values (RLV, RLH) relating to the long periodicity are measured during the calibration measurements. The correction curve (33) is calculated by linear interpolation from the difference between these measurement values and the associated theoretical phase differences (SLH, SLK). The dotted correction curve (237) relating to the short periodicity is correspondingly formed from (RKV, RKH, SLV, SLH).

(DL') is the offset-corrected phase measurement value relating to the long periodicity (Equation 5), and (DK') is the offset-corrected phase value relating to the short periodicity corresponding to Equation (6). The order of the long periodicity known from the coarse position of the measurement volume is denoted by (NL). (DL') is subject to the error (L'). The associated interpolated correction value is (L"). This correction value (L") is subtracted from (DL') and the coarse Z-value (ZG), which is still subject to a small residual error, is calculated according to the equation $f(ZG) = NL + DL' - L''$.

For (ZG), the associated apparent phase value (PK'), subject to error, relating to the short periodicity, is calculated and is decomposed into the order (NK') and the phase remainder (RK').

It follows from the comparison between (RK') and (DK') in the example shown that the order (NK') is to be increased by unity. The sum (NK+DK') is then corrected by a procedure analagous to that described in relation to FIG. 3a, and the connected Z-coordinates are calculated.

The invention is not limited to the performance of exactly two calibration measurements. One or two additiional calibration measurements, for which the reference surface is arranged in the interior of the measurement volume, can on the contrary be carried out. The correction curve is then calculated by a polynomial interpolation, instead of a linear interpolation, from the deviations between the reference phase values and theoretical phase values. The process according to the invention then gives good measurement results, even with severe deviations from the theoretical geometry, and only two through four calibration measurements are necessary for this.

The invention has been described with reference to the embodiment example in FIGS. 1 and 2 for the case of central projection, since this is the more practically important case, although it is the more complicated case because of the non-equidistant contour surfaces. The analagous transfer to parallel projection or to a convergent arrangement arises through a correspondingly suited function f(Z) for the linearization of the course of the theoretical phase. For parallel projection, for example, $f(Z) = Z$ is to be chosen.

With the aid of the drawings, a preferred embodiment has been described in which the patterns of different periodicity were produced by the formation of the beat phases between a total of three projectors. The process according to the invention can however likewise be used when only two fringe patterns are projected, the beats of which are formed with a theoretical fringe pattern which is only stored in a computer memory and results from the theoretical geometry, as is described in German Application P 41 29 796.2. The process according to the invention can likewise be used when only a single projector is provided, which either projects different fringe patterns into the measurement volume, as is described, for example, in U.S. Pat. No. 4,488,172 (Hutchin) or in the European Patent No. 0,379,079 (Zumbrunn et al.), or in which the grating is imaged in the measurement volume with different imaging widths, as in German Application P 41 42 564.2. The periodicities can also be produced by the utilization of a projected grating with two cameras, analagously to German Application P 41 30 237.0.

The invention can also be applied in processes of more than two stages. In a three-stage process, the manner of inference between the long and the middle periodicity would take place exactly as described. Thereafter, the apparent phase value subject to error including the phase order, relating to the short periodicity, would be inferred from the middle value. A third correction step, with a final coordinate determination, would then follow, according to a consideration of the phase order with the aid of the calculated and measured phase remainder. Reference phase remainder values for two reference surfaces would be taken into account during the corrections, respectively for the long, the middle and the short periodicity.

We claim:

1. Process for the measurement of object topographies by means of fringe patterns projected onto a measurement object within a measurement volume by the aid of a measurement apparatus, which measurement apparatus deviates in unknown manner from its desired set up, the method comprising:

evaluating phase measurement values from projections such that first phase measurement values arise relating to a first spatial periodicity with a large distance between contour surfaces and second phase measurement values arise relating to a second spatial periodicity with a small distance between contour surfaces, carrying out at least a first calibration measurement with respect to a calibration surface in a forward region of said measurement volume and generating first reference phase values, carrying out at least a second calibration measurement with respect to a calibration surface in a rearward region of said measurement volume remote from said measurement apparatus and generating second reference phase values, and correcting said phase measurement values taking into account said first and second reference phase values of said at least first and second calibration measurements, the correcting step comprising the steps of calculating a phase value, defining an apparent phase value, relating to said second spatial periodicity from said first phase measurement value under consideration of said first and second reference phase values and theoretical phase values calculated from the desired set up of the measurement apparatus for said at least first and second calibrations measurement, dividing said apparent phase value into a fringe order and phase remainder, and comparing said phase remainder with a value calculated from said second phase measurement value.

2. Process according to claim 1, further comprising calculating a corrected fringe order (NK) from said fringe order (NK') according to:

NK=NI'+1 for RI'−DK'>0.5,

NK=NK'−1 for DK'−RK'>0.5, and

NK=NK'in all other cases

3. Process according to claim 2, further comprising calculating the three space coordinates (X, Y, Z) of any measurement object point from said corrected fringe order (NK) and said offset-corrected phase value (DK') relating to short periodicity.

4. Process according to claim 1, further comprising calculating corrected phase values utilizing a function that is linear with respect to said first and second phase measurement values which function reproduces theoretical phases for points on said calibration surfaces.

5. Process according to claim 1, further comprising carrying out correction of said phase measurement values depending upon temperature.

6. Process for the measurement of object topographies by means of fringe patterns projected onto a measurement object within a measurement volume by the aid of a measurement apparatus, which measurement apparatus deviates in unknown manner from its desired set up, the method comprising:
   evaluating phase measurement values from projections such that first phase measurement values arise relating to a first spatial periodicity with a large distance between contour surfaces and second phase measurement values arise relating to a second spatial periodicity with a small distance between contour surfaces,
   carrying out at least a first calibration measurement with respect to a calibration surface in a forward region of said measurement volume and generating first reference phase values, and
   carrying out at least a second calibration measurement with respect to a calibration surface in a rearward region of said measurement volume remote from said measurement apparatus and generating second reference phase values,
   wherein said at least first and second calibration measurements are carried out on a single white matt surface in two parallel positions.

7. Process according to claim 6, wherein the distance between the position of the calibration surface in said forward region and the calibration surface in said rearward region of said measurement volume is chosen such that the reference values of calibration measurements relating to said second spatial periodicity differ by a non-integer number greater than unity.

8. Process for the measurement of object topographies by means of fringe patterns projected onto a measurement object within a measurement volume by the aid of a measurement apparatus, which measurement apparatus deviates in unknown manner from its desired set up, the method comprising:
   evaluating phase measurement values from projections such that first phase measurement values arise relating to a first spatial periodicity with a large distance between contour surfaces and second phase measurement values arise relating to a second spatial periodicity with a small distance between contour surfaces,
   carrying out at least a first calibration measurement with respect to a calibration surface in a forward region of said measurement volume and generating first reference phase values, and
   carrying out at least a second calibration measurement with respect to a calibration surface in a rearward region of said measurement volume remote from said measurement apparatus and generating second reference phase values,
   wherein the distance between the position of the calibration surface in said forward region and the calibration surface in said rearward region of said measurement volume is chosen such that the reference values of calibration measurements relating to said second spatial periodicity differ by a non-integer number greater than unity.

9. Apparatus for the measurement of object surfaces by means of projection, recording and phase evaluating of brightness patterns, the evaluation generating phase values being corrected by correction data recorded during two calibration measurements, comprising:
   at least one projector for the projection of periodic fringe patterns onto an object surface,
   at least one camera for recording fringe patterns deformed by said object surface, and
   an evaluating computer connected to said camera in which the object surface topography is calculated from the phase values of the recorded fringe patterns, utilizing a first pattern with long periodicity and at least a second pattern with short periodicity and resulting in first and second phase values relating to the pattern with long periodicity and short periodicity, respectively, wherein said evaluation computer includes
   two image memories for storing first correction data relating to said pattern with long periodicity obtained by said two calibration measurements,
   two further image memories for storing second correction data relating to said pattern with short periodicity obtained by said two calibration measurements,
   at least one stored table for estimating a phase value, defining an apparent phase value, for the pattern with short periodicity from said first phase value for the pattern with long periodicity under consideration of said first and second correction data, and
   at least a second stored table for calculating a fringe order relating to the pattern with short periodicity by comparing said apparent phase value and a further phase value calculated from said second phase value.

10. Apparatus according to claim 9, further comprising means for temperature measurement and means for taking into account during correction of the phase measurement values, temperature-dependent phase offsets that take into account temperature drift of the measurement apparatus.

* * * * *